Oct. 11, 1949. W. L. SCHLEGEL, JR 2,484,750
SNUBBER
Filed Sept. 4, 1944
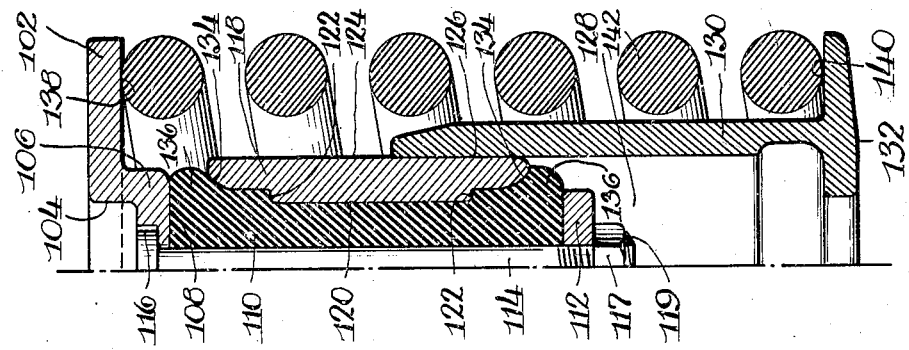
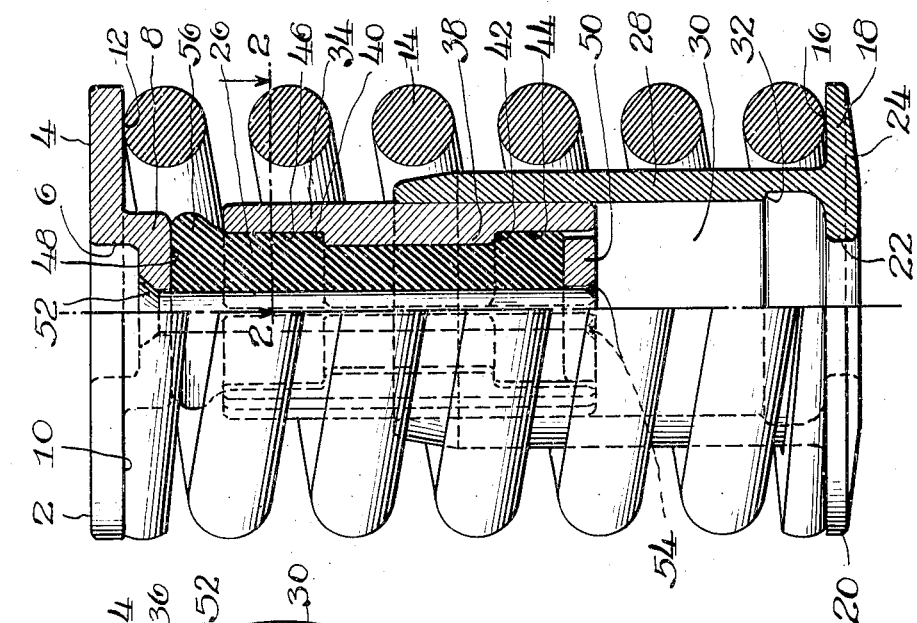
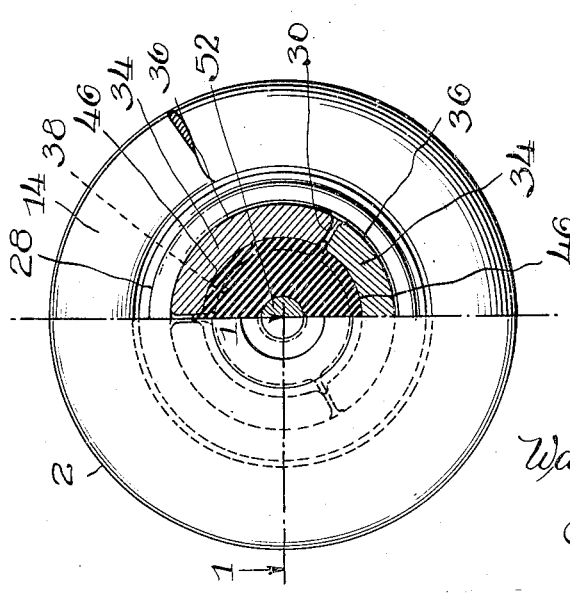
INVENTOR.
Walter L. Schlegel, Jr.
BY
Atty.

Patented Oct. 11, 1949

2,484,750

UNITED STATES PATENT OFFICE 2,484,750

SNUBBER

Walter L. Schlegel, Jr., Chicago, Ill., assignor to American Steel Foundries, Chicago, Ill., a corporation of New Jersey Application September 4, 1944, Serial No. 552,630

14 Claims. (Cl. 267—9)

My invention relates to a friction absorbing device or snubber and is illustrated in a modification adapted to replace a standard spring coil in a railway freight car truck. It will readily be recognized by those skilled in the art that, although so illustrated, my novel principle is readily adaptable to friction devices utilizing larger spaces, such as those suitable for replacement of the coil springs in a passenger car truck or elsewhere when it is desired to associate dampening means with a larger spring group or simply to interpose such dampening means between relatively movable members.

An object of my invention is to devise such a snubber which will be relatively simple in form, easy to manufacture and assemble, and fit for such uses as those referred to.

A more specific object of my invention is to devise a novel snubber having top and bottom followers, on one of which may be mounted a friction barrel and on the other of which may be supported a single resilient element serving to carry, as well as to actuate, the friction shoes which may also be urged into engagement with said friction barrel by said single resilient element.

This novel feature of having the single resilient element serving to urge the shoes against the barrel, as well as to support and actuate them, is particularly advantageous when the respective followers are seated against supporting and supported members which have relative rocking movement or permit some torsional action, such as is exhibited in the relationship of the bolster and side frame of an ordinary freight car truck. In other words, some relative rocking movement is permitted by my novel arrangement between the respective followers by distortion of the single resilient means, while, at the same time, permitting the shoes to maintain their normal alignment with respect to the friction barrel against which they seat.

A different object of my invention is to devise such a novel arrangement as that described wherein is avoided any rigid or metal-to-metal interlock between the friction shoes and their actuating follower, a condition which has sometimes resulted in breaking the shoes or other portions of the device.

In the drawings,

Figure 1 is a side elevation of one embodiment of my novel form of snubber, the left half thereof being a plan view and the right half thereof a sectional view taken approximately in the vertical plane indicated by the line 1—1 of Figure 2.

Figure 2 is a top plan view of the structure shown in Figure 1, taken half in section, the section being taken along the horizontal plane approximately indicated by the line 2—2 of Figure 1.

Figure 3 is a fragmentary sectional view comparable to the sectional view at the right of Figure 1, showing a further modification of my invention.

Referring first to the modification illustrated in Figures 1 and 2, the top follower generally designated 2 may have the flat outer face 4 forming a seat for that end of the device, and said follower may have a central recess 6 for convenient association with positioning means where desired. On the inner face of the follower 2 may be formed a lug 8 defining in part the before-mentioned recess 6, the perimeter of said lug defining the inner margin of the spring seat 10 on the inner face of the follower 2 against which may bear as at 12 the compression spring 14 whose opposite end may seat as at 16 against the annular flange 18 formed as a portion of the bottom follower 20. Said bottom follower 20 may have a central recess 22 to accommodate positioning means and may have a chamfer as at 24 about its outer perimeter to accommodate such tipping movement of the device as may be desired. On the other hand, if desired, the seating face of the bottom follower may be formed flat as illustrated in the top follower 2 where it is desired to depend upon the before-mentioned novel feature in my device which permits such relative tipping movement between the respective followers to be taken up by the central resilient member generally designated 26.

The bottom follower 20 may have integrally formed therewith a friction barrel 28 of cylindrical form, said barrel having on its inner face a continuous friction surface 30, the lower extremity of said surface being defined by the shoulder 32 below which a relieved portion may thus be formed. A plurality of friction shoes 34, 34 of segmental cylindrical form may seat as at 36, 36 against the before-mentioned friction surface 30, each of said shoes having on its inner face a central horizontal ledge 38 defined by top and bottom shoulders 40, 42, said ledges of all shoes being horizontally aligned and received within a complementary slot formed in the circumference of said resilient member 26 centrally thereof. Each shoe may, if desired, be vulcanized to the element 26 for a portion of the length thereof, as, for example, along the ledge portion of the shoe which is received within the complementary horizontal slot of the resilient element 26.

Said resilient member 26 may be a solid block of material of any desired resilient composition, said block being substantially cylindrical in form with the before-mentioned central annular slot for reception of the before-mentioned central portions or ledges 38, 38 of the shoes, below which the said resilient member 26 may be somewhat enlarged and may bear about its circumference against the respective friction shoes 34, 34 as at 44. Similarly, the upper portion of said resilient member 26 may be confined between the respective shoes and seat thereagainst as at 46, 46. The resilient member 26 may be compressed to whatever desired tension between the lug 8 of the top follower against which it may seat as at 48, the washer or spring cap 50 at the other extremity of the member 26, and the three friction shoes, said desired tension being maintained by the pin or bolt 52, the upper end of which may be recessed in the top follower 2, the body of which may extend through a central opening in the resilient member 26 so that the other extremity of said pin 52 may be welded as at 54, 54 to the cap or washer 50. My novel arrangement contemplates assembling as a unit, by means of a jig, the top follower 2, the resilient member 26, a plurality of friction shoes 34, 34, the washer member 50, and the retaining bolt or pin 52. While supported in such a jig, the inner end of such top follower assembly may be inserted within the open end of the friction barrel 28 of the bottom follower. Prior to such insertion, the compression spring 14 may be held compressed solid against the seat 16 on the bottom follower.

In my novel arrangement, the precompression or tension of the top follower assembly, as before referred to, may be whatever is required within the limits of the resilient material used in the element 26, and the degree of compression or tension thereof will determine the amount of bulge which takes place at its upper end about the circumference thereof as at 56. A suitable space must be provided between the lug 8 and the upper ends of the friction shoes 34, 34 to accommodate such expansion of the resilient member 26 as may be desired, depending upon the degree of compression to which said member 26 is to be subjected. This will be determined by the contemplated life of the device, depending upon the wear between the friction shoes and the friction barrel and the amount of friction required for the particular application. In any case, I contemplate such precompression of the element 26 as will result in a distinct bulge at one or both ends thereof so that a portion of said element will be interposed between the end of each shoe and the adjacent follower lug or spring seat against which opposite ends of said element may bear. It will readily be understood that the diameter of the device may be increased where it is desired to accommodate a larger amount of radial expansion of the resilient member 26 as wear takes place. Moreover, I may, where desired, make adjustable the tension on the resilient member 26, substituting a bolt and nut assembly for the pin 52 with the head of the bolt in the recess 6 of the top follower and the nut thereof on the threaded end of said bolt bearing against the cap or washer 50. Such adjustment, however, would only be practicable under certain limited conditions of application.

It may be noted that the resilient member 26 affords a direct force path between the members 8, 50, and 34, 34, thereby yieldingly restraining relative rocking movement between the top and bottom followers.

The modification illustrated in Figure 3 differs from that of Figures 1 and 2 principally in that expansion or bulge of the resilient member under compression is permitted at the lower end of the friction shoes as well as thereabove. In the said modification of Figure 3, the top follower 102 may be identical with that of the previous modification, having the recess 104 defined in part by the central lug 106 affording a seat as at 108 for the resilient member 110 which may be compressed between said seat 108 and the spring cap or washer 112 at the opposite end thereof by means of the threaded bolt 114, the squared head of which may be seated at 116 in the lug 106, and the lower end of which may project beyond the seat 112 and be secured by the nut 117 which may be fixed in position by welding as at 119. A series of segmental cylindrical friction shoes 118, 118, two or more in number, may be seated as at 120 about the circumference of the resilient member 110 and be positioned with respect thereto as at 122, 122 as in the previous modification, each of said friction shoes presenting on its outer surface a face 124 in frictional engagement as at 126 with the continuous cylindrical friction face 128 on the barrel 130 which is integrally formed with the bottom follower 132, substantially identical with the bottom follower of the previous modification. In the modification now under consideration, each friction shoe 118 may have at each end thereof a smooth radial lip 134 accommodating the smooth flow therealong of the bulging portion 136 at the adjacent end of the resilient member 110. Seated against the top and bottom followers respectively as at 138 and 140 may be the main compression spring 142, an arrangement substantially identical to that described for the previous modification.

In the modification of Figure 3, like that of Figure 1 and 2, there is no metal-to-metal stop limiting the stroke of the device, except as may occur when the main compression springs are forced solid. In both modifications, some relative tilting between the respective followers is permitted without misalignment of the friction shoes by distortion of the resilient member along which the shoes are supported. The retaining bolt may be designed to accommodate some bending moment, as in spring steel. Where it is desired to accommodate a relatively large amount of wear between the friction housing and the shoes, it would be necessary to increase the size of the resilient element 26, and this can be done by enlarging the diameter thereof in proportion to the diameter of the device as a whole.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a friction device, a follower having a friction barrel, a spaced follower assembly resiliently supporting shoes for frictional engagement with said barrel, a compression spring between said follower and said assembly, said assembly comprising a base, a cylindrical resilient element having an end seated against said base, said element having an annular groove centrally thereof; a plurality of friction shoes positioned around said element with ledges in said groove, a spring seat at the end of said assembly remote from said base and seating the other end of said element, said base and said seat being spaced from said first-mentioned follower, and securing means extending between said seat and base and retaining said element under compression therebetween, said base being spaced from the adjacent ends of said shoes to accommodate flow of said element, said securing means being adjustable to modify the compression of said element as wear takes place between said shoes and said barrel.

2. In a snubber, a follower comprising a friction barrel, shoe members within said barrel in frictional engagement therewith, another follower, a sping sleeved over said barrel in abutment with said followers, and means connecting said members to said other follower for actuation thereby, said means comprising a pair of spaced abutment members both being spaced from said shoe members, one of said abutment members being integral with said other follower and the other of said abutment members being spaced from both followers, rigid means connecting the other abutment member to said other follower, and a block of resilient material sleeved on said rigid means under compression between all of said members, said material being formed and arranged to afford a direct force path between each of said members and every other thereof.

3. In a snubber, spaced followers, a compression spring therebetween, said bottom follower having an integral friction barrel, said top follower supporting an assembly comprising a plurality of friction shoes in engagement with said barrel, a spring seat spaced from said top follower, a homogeneous resilient element spaced from said bottom follower and positioned between said seat and top follower, a plurality of friction shoes carried on said element within said barrel, rigid means extending between said seat and top follower through said element for maintaining said element under compression, and means for adjusting the length of said rigid means to modify said compression, said shoes having their respective ends spaced from said top follower and seat respectively to accommodate flow of said element therebetween.

4. In a snubber, spaced followers, a compression spring therebetween, said bottom follower having an integral friction barrel, said top follower supporting an assembly comprising a plurality of friction shoes in engagement with said barrel, a spring seat spaced from said top follower, a homogeneous resilient element spaced from said bottom follower and positioned between said seat and top follower, a plurality of friction shoes carried on said element within said barrel, and rigid means extending between said seat and top follower through said element for maintaining said element under compression, said shoes having their respective ends spaced from said top follower and seat respectively to accommodate flow of said element therebetween, each shoe having at an end thereof a smooth radial surface accommodating the flow of said element therealong.

5. In a friction device, a follower having a friction barrel, a spaced follower assembly resiliently supporting shoes for frictional engagement with said barrel, a compression spring between said follower and said assembly, said assembly comprising a base, a cylindrical resilient element having an end seated against said base, said element having an annular groove centrally thereof, a plurality of friction shoes positioned around said element with ledges in said groove, a spring seat at the end of said assembly remote from said base, and securing means extending between said seat and base and retaining said element under compression therebetween, said base being spaced from the adjacent ends of said shoes to accommodate flow of said element.

6. In a friction device, a follower having a friction barrel, a spaced follower assembly resiliently supporting shoes for frictional engagement with said barrel, a compression spring between said follower and said assembly, said assembly comprising a base, a cylindrical resilient element having an end seated against said base, said element having an annular groove centrally thereof, a plurality of friction shoes positioned around said element with ledges in said groove, a spring seat at the end of said assembly remote from said base, and securing means extending between said seat and base and retaining said element under compression therebetween, said base and said seat being spaced from the respective ends of said shoes to accommodate flow of said element therebetween.

7. In a friction device, a follower having a friction barrel, a spaced follower assembly resiliently supporting shoes for frictional engagement with said barrel, a compression spring between said follower and said assembly, said assembly comprising a base, a cylindrical resilient element having an end seated against said base, said element having an annular groove centrally thereof, a plurality of friction shoes positioned around said element with ledges in said groove, a spring seat at the end of said assembly remote from said base, and securing means extending between said seat and base and retaining said element under compression therebetween, said securing means being adjustable to modify the compression of said element as wear takes place between said shoes and said barrel.

8. In a friction device, a follower having a friction barrel, a spaced follower assembly resiliently supporting shoes for frictional engagement with said barrel, a compression spring between said follower and said assembly, said assembly comprising a base, a cylindrical resilient element having an end seated against said base, said element having an annular groove centrally thereof, a plurality of friction shoes positioned around said element with ledges in said groove, a spring seat at the end of said assembly remote from said base and connected thereto, said element being under compression between said seat and said base, and means associated with said assembly for restoring the compression of said element as wear occurs between said shoes and said barrel.

9. In a friction device, a follower having a friction barrel, a spaced follower assembly resiliently supporting shoes for frictional engagement with said barrel, a compression spring between said follower and said assembly, said assembly comprising a base, a cylindrical resilient element having an end seated against said base, said element having an annular groove centrally thereof, a plurality of friction shoes positioned around said element with ledges in said groove, a spring seat at the end of said assembly remote from said base, and securing means extending between said seat and base and retaining said element under compression therebetween.

10. In a snubber, spaced followers, one of said followers comprising a friction barrel, friction members within said barrel in frictional engagement therewith, a compression spring between said followers and means connecting said members to the other of said followers for actuation therebetween, said means comprising a pair of spaced abutment members, both being spaced from said friction members, one of said abutment members being integral with said other follower, rigid means spaced from said one follower and connecting the other abutment member to said other follower, and a block of resilient material sleeved on said rigid means under compression between all of said members, said material being formed and arranged to afford a direct force path between each of said members and every other thereof.

11. In a snubber, spaced followers, one of said followers comprising a friction barrel, friction members within said barrel in frictional engagement therewith, a compression spring between said followers and means connecting said members to the other of said followers for actuation therebetween, said means comprising a pair of spaced abutment members, both being spaced from said friction members, one of said abutment members being integral with said other follower, rigid means spaced from said one follower and connecting the other abutment member to said other follower, and a block of resilient material spaced from said first-mentioned follower and sleeved on said rigid means and under compression between all of said members, said material being formed and arranged to afford a direct force path between each of said members and every other thereof.

12. A shock absorber comprising a friction barrel, a friction assembly relatively movable with respect thereto comprising spaced interconnected seat members, one of said seat members being disposed in the barrel and the other externally thereof, a plurality of shoe members spaced from said seat members and spaced from each other circumferentially of the barrel and frictionally engaged with the interior thereof, a mass of resilient material under compression between and affording a direct force path between each of said members and every other thereof, and spring means sleeved over the barrel and engaged with abutment means thereon and with abutment means fixed with respect to said other seat member, said spring means being adapted to yieldingly resist the closure stroke of said shock absorber.

13. A shock absorber comprising a friction barrel, a friction assembly movable axially of said barrel and comprising spaced interconnected seat members, one of said seat members being disposed in the barrel and the other being disposed externally thereof, a plurality of shoe members spaced from said seat members and spaced from each other circumferentially of the barrel and frictionally engaged with the interior thereof, and a mass of flowable resilient material under compression between and reacting against all of said members, portions of said material being disposed between surfaces of said seat members and axially aligned surfaces of said shoe members whereby said portions are compressed between said surfaces during movement of said assembly axially of said barrel.

14. A shock absorber comprising a friction barrel, a friction assembly relatively movable with respect thereto comprising spaced interconnected seat members movable as a unit, a plurality of shoe members spaced from said seat members and spaced from each other circumferentially of the barrel and frictionally engaged with the interior thereof, and a mass of flowable resilient material compressed by and between all of said members, portions of said material being disposed between said shoe members and at least one seat member for compression therebetween during actuation of said absorber.

WALTER L. SCHLEGEL, JR.

REFERENCES CITED

The following references are of record in the file of this patent:

UNITED STATES PATENTS

| Number | Name | Date |
|---|---|---|
| 990,293 | Rimailho | Apr. 25, 1911 |
| 1,985,369 | Fuchs | Dec. 25, 1934 |
| 2,010,623 | Bugatti | Aug. 6, 1935 |
| 2,205,098 | Lamont | June 18, 1940 |
| 2,212,759 | Tea | Aug. 27, 1940 |
| 2,263,599 | Tucker | Nov. 25, 1941 |
| 2,205,392 | Olander | Dec. 9, 1941 |
| 2,279,914 | Cottrell | Apr. 14, 1942 |
| 2,306,393 | Light | Dec. 29, 1942 |
| 2,328,550 | Gallagher | Sept. 7, 1943 |

FOREIGN PATENTS

| Number | Country | Date |
|---|---|---|
| 9,127 | Great Britain | Mar. 3, 1904 |